United States Patent [19]
Stephan et al.

[11] Patent Number: 6,063,879
[45] Date of Patent: May 16, 2000

[54] HIGH TEMPERATURE SOLUTION POLYMERIZATION PROCESS WITH PHOSPHINIMINE CYCLOPENTADIENYL METAL (GRP IV) COMPLEX

[75] Inventors: Douglas W. Stephan, LaSalle; Jeff C. Stewart, Windsor; Stephen John Brown, Calgary; John William Swabey, Calgary; Qinyan Wang, Calgary, all of Canada

[73] Assignee: Nova Chemicals (International) S.A., Villars-sur-Glane, Switzerland

[21] Appl. No.: 08/960,489

[22] Filed: Oct. 29, 1997

[30] Foreign Application Priority Data

May 30, 1997 [CA] Canada ................................. 2206944

[51] Int. Cl.$^7$ ................................. C08F 2/00; C08F 4/64; C08F 10/02
[52] U.S. Cl. .................... 526/127; 526/126; 526/134; 526/160; 526/161; 526/170
[58] Field of Search ..................... 526/126, 127, 526/132, 133, 134, 160, 161, 170, 172

[56] References Cited

U.S. PATENT DOCUMENTS 5,264,405  11/1993  Canich ..................... 502/103
5,625,016   4/1997  Schiffino et al. ............ 526/160

OTHER PUBLICATIONS

Cyclopentadienyl Titanium Complexes with Aryldiazenido– or Phosphiniminato–Ligands by J.R. Dilworth, Journal of Organometallic Chemistry, 159 (1978) 47–52.

Synthese und Reaktionen von ($\eta^5$ Pentamethylcyclopentadienyl)– und ($\eta^5$ –Ethyltetramethylcyclopentadienyl)titantrifluorid [1] by S. Mansoreh et al, Chem.

Neue Komplexe des Titans mit silylierten Aminoiminophosphoran–und Sulfodiimidliganden by R. Hasselbring et al, Zeitschrift für anorganische und allegemeine Chemie, 619(1993) 1543–1550.

Poster Presentation by J.C. Stewart and D.W. Stephan, Dept. of Chemistry and Biochemistry, The University of Windsor at the IDW Conference at McGill University in Nov. 1996.

Phosphaniminato–Komplexe des Titans. Synthese und Kristallstrukturen von $CpTiCl_2(NPMe_3)$, $[TiCl_3(NPMe_3)]_2$, $[Ti_2Cl_5(NPMe_2Ph)_3]$und $[Ti_3Cl_6(NPMe_3)_5][BPh_4]$ by T. Rubenstahl et al, Zeitschrift fur anorganische und allegemeine Chemie, 620 (1994) 1741–1749;

Syntheses and Reactivity of Aminobis(diorganylamino) phosphanes by G. Schick et al., Chem. Ber., 1996, 129, 911–917.

*Primary Examiner*—Christopher Henderson
*Attorney, Agent, or Firm*—Kenneth H. Johnson

[57] ABSTRACT

This invention is a solution process for the preparation of high molecular weight ethylene copolymers comprising contacting olefin monomers, with a catalyst system at a polymerization temperature at or above about 80° C. with a catalyst system comprising an unbridged Group 4 metal compound having a monocyclopentadienyl ligand, a phosphinimine ligand and at least one uninegative, activation reactive ligand. The process can be practiced at a reaction temperature of at least 80° C. to obtain high number average molecular weight polymer.

31 Claims, No Drawings

HIGH TEMPERATURE SOLUTION POLYMERIZATION PROCESS WITH PHOSPHINIMINE CYCLOPENTADIENYL METAL (GRP IV) COMPLEX

TECHNICAL FIELD

This invention relates to the preparation of high molecular weight olefin polymers and co-polymers using relatively high temperature solution polymerization conditions in the presence of a catalyst system comprising a complex consisting of a Group 4 metal, a monocyclopentadienyl, a covalently bonded phosphinimine (also sometimes called phosphane imine) ligand, and at least one activatable leaving ligand; and an activator comprising an anion activating species.

BACKGROUND OF THE INVENTION

Polymers comprising ethylene and optionally one or more olefins are well known and have applications in a wide range of fields from film packaging to thermoplastic elastomers.

Alpha-olefin co- and homopolymers have traditionally been prepared in the presence of Ziegler-Natta catalyst systems largely based on vanadium and/or titanium and with the use of metal alkyl activators. Newer metallocene catalyst compounds have received attention due to their improved incorporation of comonomers, high activities and improvements in certain physical properties of the resultant polymers, such as puncture resistance. Although broadly described as suitable for polyolefin solution polymerization processes, metallocene catalysts have shown some limitations in their molecular weight capabilities and catalyst activity (especially at temperatures greater than about 100° C. in solution processes). Due to relatively fast termination (or chain transfer) reactions, such as the beta-hydride elimination reaction, metallocene catalysts may at temperatures, typically above 100° C., produce olefin polymers and copolymers having a molecular weight (Mn) of less than about 20,000. Additionally, it is generally recognized that, metallocene type catalysts in their reactive form tend to undergo deactivation processes at temperatures above about 100° C.

Some of the phosphinimine Group 4 metal complexes of the present invention are not novel per se. For example, some complexes, or homologues thereof, have been disclosed in a number of scientific papers including:

Cyclopentadienyl Titanium Complexes with aryldiasenido or phosphiniminato-Ligands by J. R. Dilworth, *Journal of Organometallic Chemistry*, 159 (1978) 47–52;

Synthese und Reaktionen von ($\eta^5$-Pentamethylcyclopentadienyl)-und ($\eta^5$-Ethyltetramethylcyclopentadienyl)titantrifluorid by S. Manshoeh et al, *Chem. Ber.*, 1993 136, 913–919;

Neue Komplexe des Titans mit silylierten Aminoiminophosphoran-und Sulfodiimidliganden by R. Hasselbring et al, *Zeitschrift für anorganische und allgemeine Chemie*, 619 (1993) 1543–1550;

Phosphaniminato-Komplese des Titans, Syntheses und Kristallstrukturen von CpTiCl$_2$(NPMe$_3$), [TiCl$_3$(NPMe$_3$)]$_2$, Ti$_2$Cl$_5$(NPMe$_2$Ph)$_3$ und [Ti$_3$Cl$_6$(NPMe$_3$)$_5$][BPh] by T. Rubenstahl et al, *Zeitschrift für anorganische und aligemeine Chemie*, 620 (1994) 1741–1749; and Syntheses and reactivity of Aminobis(diorganylamino) phosphanes by G. Shick etal, *Chem. Ber.*, 1996,129, 911–917.

While the above art discloses some of the complexes per se, and in one instance the complex in conjunction with an activator, the art does not disclose the polymerization of olefins, and in particular the polymerization of olefins in a solution process.

A poster presentation by J. C. Stewart and D. W. Stephan, Department of Chemistry and Biochemistry, The University of Windsor, at the IDW conference at McGill University in November 1996, discloses polymerization of ethylene at room temperature using the complexes of the present invention. The turnover in terms of grams of polyethylene/mmol/hr (e.g. productivity or activity) is several orders of magnitude below that obtained with the activation of the present invention. The poster presentation does not disclose the use of the catalyst systems of the present invention at a temperature above room temperature or results which approach commercial application.

The above art does not disclose complexes of the formula:

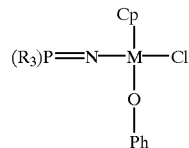

where Cp is a cyclopentadienyl radical, R is a C$_{1-6}$ alkyl radical, and Ph is a phenyl radical which is unsubstituted or substituted by up to 6 hydrocarbyl radicals (preferably C$_{1-6}$).

U.S. Pat. No. 5,625,016, issued Apr. 29, 1997, assigned to Exxon Chemical Patents Inc. discloses the polymerization of olefins and in particular the preparation of ethylene propylene rubbers or ethylene propylene diene monomer copolymers, in the presence of a catalyst system prepared from an unbridged Group 4 metal, a bulky (substituted) monocyclopentadienyl ligand, a uninegative bulky group 15 ligand and two uninegative activation reactive ligands. The disclosure of the patent teaches the group 15 ligand is an amido ligand. Additionally, all of the exemplified ligands are amido ligands. Further the disclosure teaches the group 15 ligand is disubstituted (i.e. —N—(R)$_2$). The patent does not teach a phosphinimine ligand in which the nitrogen atom is covalently bonded to the group 4 metal and also double bonded to a five valent phosphorus atom (i.e. —N═P (which is further bound at three additional coordination sites)). As such a phosphinimine ligand may be viewed as a group 15 ligand which is singly substituted. In short the reference does not teach, or suggest, the complexes of the present invention.

Catalyst systems based on bridged monocyclopentadienyl titanium compounds activated with alumoxane suitable for the preparation of ethylene-olefin copolymers of high molecular weight and high alpha-olefin content are described in U.S. Pat. No. 5,264,405. This patent teaches that the cyclopentadienyl group should be fully substituted with methyl groups and bridged to an amido group having an aliphatic or alicyclic hydrocarbyl ligand bonded through a primary, secondary or tertiary carbon. The complexes of the present invention are distinct over those of this patent as they are not bridged.

INVENTION DISCLOSURE

The invention provides a solution process for the polymerization of ethylene and optionally one or more aliphatic or aromatic hydrocarbyl C$_{2-20}$ mono- or di-olefins at a temperature from 80° C. to 250° C. at pressures up to 15,000 psig (preferably to form a polymer) in the presence of a precursor comprising a Group 4 metal complex of the formula:

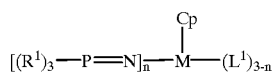

wherein M is selected from the group consisting of Ti, Zr, and Hf; n is 1 or 2; Cp is a monocyclopentadienyl ligand which is unsubstituted or substituted by up to five substituents independently selected from the group consisting of a $C_{1-10}$ hydrocarbyl radical or two hydrocarbyl radicals taken together may form a ring which hydrocarbyl substituents or cyclopentadienyl radical are unsubstituted or further substituted by a halogen atom, a $C_{1-8}$ alkyl radical, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals; germanyl radicals of the formula Ge—$(R^2)_3$ wherein $R^2$ is as defined above; each $R^1$ is independently selected from the group consisting of a hydrogen atom, a halogen atom, $C_{1-10}$ hydrocarbyl radicals which are unsubstituted by or further substituted by a halogen atom, a $C_{1-8}$ alkyl radical, $C_{1-8}$ alkoxy radical, a $C_{6-10}$ aryl or aryloxy radical, a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, germanyl radical of the formula Ge—$(R^2)_3$ wherein $R^2$ is as defined above or two $R^1$ radicals taken together may form a bidentate $C_{1-10}$ hydrocarbyl radical, which is unsubstituted by or further substituted by a halogen atom, a $C_{1-8}$ alkyl radical, $C_{1-8}$ alkoxy radical, a $C_{6-10}$ aryl or aryloxy radical, a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, germanyl radicals of the formula Ge—$(R^2)_3$ wherein $R^2$ is as defined above, provided that $R_1$ individually or two $R_1$ radicals taken together may not form a Cp ligand as defined above; each $L^1$ is independently selected from the group consisting of a hydrogen atom, of a halogen atom, a $C_{1-10}$ hydrocarbyl radical, a $C_{1-10}$ alkoxy radical, a $C_{5-10}$ aryl oxide radical, each of which said hydrocarbyl, alkoxy, and aryl oxide radicals may be unsubstituted by or further substituted by a halogen atom, a $C_{1-8}$ alkyl radical, $C_{1-8}$ alkoxy radical, a $C_{6-10}$ aryl or aryl oxy radical, an amido radical which is unsubstituted or substituted by up to two $C_{1-8}$ alkyl radicals; a phosphido radical which is unsubstituted or substituted by up to two $C_{1-8}$ alkyl radicals, provided that $L^1$ may not be a Cp radical as defined above; and an activator.

A further aspect of the present invention provides a complex reactive at temperatures greater than 80° C. to produce olefin polymers preferably comprising a Group 4 metal complex of the formula:

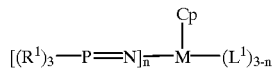

wherein M is selected from the group consisting of Ti, Zr, and Hf; n is 1 or 2; Cp is a monocyclopentadienyl ligand which is unsubstituted or substituted by up to five substituents independently selected from the group consisting of a $C_{1-10}$ hydrocarbyl radicals or two hydrocarbyl radicals taken together may form a ring which hydrocarbyl substituents or cyclopentadienyl radical are unsubstituted or further substituted by a halogen atom, a $C_{1-8}$ alkyl radical, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two C1-8 alkyl radicals; silyl radicals of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals; germanyl radicals of the formula Ge—$(R^2)_3$ wherein $R^2$ is as defined above; each $R^1$ is independently selected from the group consisting of a hydrogen atom, a halogen atom, $C_{1-10}$ hydrocarbyl radicals which are unsubstituted by or further substituted by a halogen atom, a $C_{1-8}$ alkyl radical, $C_{1-8}$ alkoxy radical, a $C_{6-10}$ aryl or aryloxy radical, a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, germanyl radical of the formula Ge—$(R^2)_3$ wherein $R^2$ is as defined above or two $R^1$ radicals taken together may form a bidentate $C_{1-10}$ hydrocarbyl radical, which is unsubstituted by or further substituted by a halogen atom, a $C_{1-8}$ alkyl radical, $C_{1-8}$ alkoxy radical, a $C_{6-10}$ aryl or aryloxy radical, a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, germanyl radicals of the formula Ge—$(R^2)_3$ wherein $R^2$ is as defined above, provided that $R_1$ individually or two $R_1$ radicals taken together may not form a Cp ligand as defined above; each $L^1$ is independently selected from the group consisting of a hydrogen atom, of a halogen atom, a $C_{1-10}$ hydrocarbyl radical a $C_{1-10}$ alkoxy radical, a $C_{5-10}$ aryl oxide radical, each of which said hydrocarbyl, alkoxy, and aryl oxide radicals may be unsubstituted by or further substituted by a halogen atom, a $C_{1-8}$ alkyl radical, $C_{1-8}$ alkoxy radical, a $C_{6-10}$ aryl or aryl oxy radical, an amido radical which is unsubstituted or substituted by up to two $C_{1-8}$ alkyl radicals; a phosphido radical which is unsubstituted or substituted by up to two $C_{1-8}$ alkyl radicals, provided that $L^1$ may not be a Cp radical as defined above; and an activator.

BEST MODE AND EXAMPLES OF THE INVENTION

As used in this specification the term "cyclopentadienyl" refers to a 5-member carbon ring having delocalized bonding within the ring and typically being bound to the Group 4 metal (M) through covalent $\eta^5$-bonds.

The term "scavenger" as used in this specification is meant to include those compounds effective for removing polar impurities from the reaction solvent. Such impurities can be inadvertently introduced with any of the polymerization reaction components, particularly with solvent, monomer and catalyst feed, and adversely affect catalyst activity and stability. It can result in decreasing or even elimination of catalytic activity, particularly when an activator capable of ionizing the Group 4 metal complex is also present.

Solution polymerization processes are fairly well known in the art. These processes are conducted in the presence of an inert hydrocarbon solvent typically a $C_{5-12}$ hydrocarbon which may be unsubstituted or substituted by $C_{1-4}$ alkyl group, such as pentane, hexane, heptane, octane, cyclohexane, methylcyclohexane and hydrogenated naphtha. An additional solvent is Isopar E ($C_{8-12}$ aliphatic solvent, Exxon Chemical Co.).

The polymerization may be conducted at temperatures from about 80° C. to about 250° C. Depending on the product being made this temperature may be relatively low such as from 80° C. to about 180° C. for some of the ethylene propylene polymers and ethylene diene monomer polymers, to temperatures from about 120° C. to about 250° C. for the more convention polyethylenes, and copolymers of ethylene and styrene. The pressure of reaction may be as high as about 15,000 psig for the older high pressure processes or may range from about 100 to 4,500 psig.

Suitable olefin monomers may be ethylene and $C_{3-20}$ mono- and di- olefins. Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene, p- t-butyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having a density from about 0.910 to 0.935 g/cc or (linear) high density polyethylene having a density above 0.935 g/cc.

The present invention might also be useful to prepare polyethylene having a density below 0.910 g/cc—the so-called very low and ultra low density polyethylenes.

The process of the present invention may be used to prepare copolymers of vinyl aromatic monomers such as styrene or substituted styrene. However the present invention may also be used to prepare copolymers of one or more $C_{2-4}$ alpha olefins, preferably ethylene and the above vinyl aromatic monomers, preferably styrene. Generally the alpha olefin may be present in an amount from about 5 to 95 weight %, preferably from about 10 to 90 weight %, and the vinyl aromatic monomer may be present in an amount from about 95 to 5 weight % preferably from about 90 to 10 weight %.

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % 30 of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

Other olefin polymers which may be prepared in accordance with the present invention may be determined by one of ordinary skill in the art using non-inventive testing.

The polymers prepared in accordance with the present invention have a good molecular weight. That is the molecular weight (Mn) will preferably be greater than about 20,000 (most preferably between 25,000 and 125,000). This is a very good result for single site or quasi single site catalysts at temperatures of greater than about 80° C. in a solution polymerization process. The unbridged Group 4 metal precursors of the present invention comprise a complex of the formula:

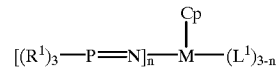

wherein M is selected from the group consisting of Ti, Zr, and Hf; n is 1 or 2; Cp is a monocyclopentadienyl ligand which is unsubstituted or substituted by up to five substituents independently selected from the group consisting of a $C_{1-10}$ hydrocarbyl radical or two hydrocarbyl radicals taken together may form a ring so as to form, for example, an indenyl or fluorenyl ligand which hydrocarbyl substituents or cyclopentadienyl radical are unsubstituted or further substituted by a halogen atom, a $C_{1-8}$ alkyl radical, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R^2)_3$ wherein each $R^2$ is independently selected from the group consisting of hydrogen, a $C_{1-8}$ alkyl or alkoxy radical, $C_{6-1}$ aryl or aryloxy radicals; germanyl radicals of the formula Ge—$(R^2)_3$ wherein $R^2$ is as defined above; each $R^1$ is independently selected from the group consisting of a hydrogen atom, a halogen atom, $C_{1-10}$ hydrocarbyl radicals which are unsubstituted or further substituted by a halogen atom, a $C_{1-8}$ alkyl radical, $C_{1-8}$ alkoxy radical, a $C_{6-10}$ aryl or aryloxy radical, a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, germanyl radical of the formula Ge—$(R^2)_3$ wherein $R^2$ is as defined above or two $R^1$ radicals taken together may form a bidentate $C_{1-10}$ hydrocarbyl radical, which is unsubstituted by or further substituted by a halogen atom, a $C_{1-8}$alkyl radical, $C_{1-8}$ alkoxy radical, a $C_{6-10}$ aryl or aryloxy radical, a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, germanyl radicals of the formula Ge—$(R^2)_3$ wherein $R^2$ is as defined above, provided that $R_1$ individually or two $R_1$ radicals taken together may not form a Cp ligand as defined above; each $L^1$ is independently selected from the group consisting of a hydrogen atom, of a halogen atom, a $C_{1-10}$ hydrocarbyl radical, a $C_{1-10}$ alkoxy radical, a $C_{5-10}$ aryl oxide radical, each of which said hydrocarbyl, alkoxy, and aryl oxide radicals may be unsubstituted by or further substituted by a halogen atom, a $C_{1-8}$ alkyl radical, $C_{1-8}$ alkoxy radical, a $C_{6-10}$ aryl or aryl oxy radical, an amido radical which is unsubstituted or substituted by up to two $C_{1-8}$ alkyl radicals; a phosphido radical which is unsubstituted or substituted by up to two $C_{1-8}$ alkyl radicals, provided that $L^1$ may not be a Cp radical as defined above.

In the Group 4 metal complex preferably Cp is unsubstituted. However, if Cp is substituted preferred substituents include a fluorine atom, a chlorine atom, $C_{1-6}$ hydrocarbyl radical, or two hydrocarbyl radicals taken together may form a bridging ring, an amido radical which is unsubstituted or substituted by up to two $C_{1-4}$ alkyl radicals, a phosphido radical which is unsubstituted or substituted by up to two $C_{1-4}$ alkyl radicals, a silyl radical of the formula —Si—$(R^2)_3$ wherein each $R^2$ is independently selected from the group consisting of a hydrogen atom and a $C_{1-4}$ alkyl radical; a germanyl radical of the formula —Ge—$(R^2)_3$ wherein each $R^2$ is independently selected from the group consisting of a hydrogen atom and a $C_{1-4}$ alkyl radical.

In the Group 4 metal complex preferably each $R^1$ is selected from the group consisting of a hydrogen atom, a halide, preferably fluorine or chlorine atom, a $C_{1-4}$ alkyl radical, a $C_{1-4}$ alkoxy radical, a silyl radical of the formula —Si—$(R^2)_3$ wherein each $R^2$ is independently selected from the group consisting of a hydrogen atom and a $C_{1-4}$ alkyl radical; and a germanyl radical of the formula —Ge—$(R^2)_3$ wherein each $R^2$ is independently selected from the group consisting of a hydrogen atom and a $C_{1-4}$ alkyl radical.

In the Group 4 metal complex preferably each $L^1$ is independently selected from the group consisting of a hydrogen atom, a halogen, preferably fluorine or chlorine atom, a hydrocarbyl such as a $C_{1-6}$ alkyl radical, a $C_{1-6}$ alkoxy radical, and a $C_{6-10}$ aryl oxide radical.

The activator may be selected from the group consisting of:
 (i) an aluminoxane; and
 (ii) an activator capable of ionizing the Group 4 metal complex (which may be used in combination with an alkylating activator).

The aluminoxane activator may be of the formula $(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. The aluminoxane activator may be used prior to the reaction but preferably in situ alkylation is typical (e.g. alkyl groups replacing $L^1$, hydrogen, or halide groups).

If the Group 4 metal complex is activated only with aluminoxane, the amount of aluminoxane will depend on the reactivity of the alkylating agent. Activation with aluminoxane generally requires a molar ratio of aluminum in the activator to Group 4 metal in the complex from 50:1 to 1000:1. MAO may be a the higher end of the above noted range.

The activator of the present invention may be a combination of an alkylating activator which also serves as a scavenger other than aluminoxane in combination with an activator capable of ionizing the Group 4 complex.

The alkylating activator (which may also serve as a scavenger) may be selected from the group consisting of $(R^3)_pMgX_{2-p}$ wherein X is a halide and each $R^3$ is independently selected from the group consisting of $C_{1-10}$ alkyl radicals and p is 1 or 2; $R^3Li$ wherein in $R^3$ is as defined above, $(R^3)_qZnX_{2-q}$ wherein $R^3$ is as defined above, X is halogen and q is 1 or 2; $(R^3)_sAlX_{3-s}$ wherein $R^3$ is as defined above, X is halogen and s is an integer from 1 to 3. Preferably in the above compounds $R^3$ is a $C_{1-4}$ alkyl radical, and X is chlorine. Commercially available compounds include triethyl aluminum (TEAL), diethyl aluminum chloride (DEAC), dibutyl magnesium $((Bu)_2Mg)$, and butyl ethyl magnesium (BuEtMg or BuMgEt).

The activator capable of ionizing the Group 4 metal complex may be selected from the group consisting of:
 (i) compounds of the formula $[R^5]+[B(R^7)_4]^-$ wherein B is a boron atom, $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and
 (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and
 iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilium radical which is substituted by two $C_{1-4}$ alkyl radicals.

The activator capable of ionizing the Group 4 metal complex abstract one or more $L^1$ ligands so as to ionize the Group 4 metal center into a cation but not to covalently bond with the Group 4 metal and to provide sufficient distance between the ionized Group 4 metal and the ionizing activator to permit a polymerizable olefin to enter the resulting active site. In short the activator capable of ionizing the Group 4 metal complex maintains the Group 4 metal in a +1 valence state, while being sufficiently liable to permit its displacement by an olefin monomer during polymerization.

Examples of compounds capable of ionizing the Group 4 metal complex include the following compounds:

triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra (o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra (o-tolyl)boron
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron
di-(isopropyl)ammonium tetra(pentafluorophenyl)boron,
dicyclohexylammonium tetra (phenyl)boron
triphenylphosphonium tetra)phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltris-pentafluorophenyl borate,
triphenylmethylium phenyl-trispentafluorophenyl borate,
benzene (diazonium) phenyltrispentafluorophenyl borate, tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-tafluorophenyl) borate,
tropillium tetrakis (3,4,5-terfluorophenyl) borate,
benzene (diazonium) tetrakis (3,4,5-trifluorophenyl) borate,
tropillinum tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available activators which are capable of ionizing the Group 4 metal complexes include:

N,N- dimethylaniliumtetrakispentafluorophenyl borate;
triphenylmethylium tetrakispentafluorophenyl borate; and
trispentafluorophenyl boron.

If the Group 4 metal complex is activated with a combination of an alkylating agent other than aluminoxane and a compound capable of ionizing the Group 4 metal complex the molar ratios of Group 4 metal:metal in the alkylating agent; metalloid (i.e. boron or phosphorus) in the activator capable of ionizing the Group 4 metal complex (e.g. boron) may range from 1:1:1 to 1:10:5. Preferably, the alkylating activator is premixed/reacted with the Group 4 metal complex and the resulting alkylated species is then reacted with the activator capable of ionizing the Group 4 metal complex.

In a solution polymerization the monomers are dissolved/dispersed in the solvent either prior to being fed to the reactor, or for gaseous monomers the monomer may be fed to the reactor so that it will dissolve in the reaction mixture. Prior to mixing, the solvent and monomers are generally purified to remove polar moieties. The polar moieties, or catalyst poisons include water, oxygen, metal impurities, etc. Preferably steps are taken before provision of such into the reaction vessel, for example by chemical treatment or careful separation techniques after or during the synthesis or preparation of the various components. The feedstock purification prior to introduction into the reaction solvent follows standard practices in the art, e.g. molecular sieves, alumina beds and oxygen removal catalysts are used for the purification of ethylene, alpha-olefin, and optional diene. The solvent itself as well (e.g. hexane and toluene) is similarly treated. In some instances, out of an abundance of caution excess scavenging activators may be used in the polymerization process.

The feedstock may be heated prior to feeding to the reactor. However, in many instances it is desired to remove heat from the reactor so the feed stock may be at ambient temperature to help cool the reactor.

Generally, the catalyst components may be premixed in the solvent for the reaction or fed as separate streams to the reactor. In some instances premixing is desirable to provide a reaction time for the catalyst components prior to entering the reaction. Such an "in line mixing" technique is described in a number of patents in the name of DuPont Canada Inc. For example it is described in U.S. Pat. No. 5,589,555 issued Dec. 31, 1996.

The reactor may comprise a tube or serpentine reactor used in the "high pressure" polymerizations or it may comprise one or more reactors or autoclaves. It is well known that the use in series of two such reactors each of which may be operated so as to achieve different polymer molecular weight characteristics. The residence time in the reactor system will depend on the design and the capacity of the reactor. Generally the reactors should be operated under conditions to achieve a thorough mixing of the reactants. On leaving the reactor system the solvent is removed and the resulting polymer is finished in a conventional manner.

The catalysts of the present invention provide a high reactivity under high temperature polymerization while also providing polymer having a high molecular weight. The reactivity of the catalysts of the present invention should provide a polymerization rate at temperatures of greater than 80° C. (Kp in l/mmol of catalyst X min) of at least 200, preferably greater than 1,000, most preferably greater than 1500. The present invention will now be illustrated by the following non-limiting examples.

The Continuous Solution Polymerization

All the polymerization experiments described below were conducted using a continuous solution polymerization reactor. The process is continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 71.5 cc internal volume. In each experiment the volumetric feed to the reactor was kept constant and as a consequence so was the reactor residence time.

The catalyst solutions were pumped to the reactor independently and there was no pre-contact between the activator and the catalyst. Because of the low solubility of the catalysts, activators and MAO in cyclohexane, solutions were prepared in toluene. The catalyst was activated in situ (in the polymerization reactor) at the reaction temperature in the presence of the monomers. The polymerizations were carried out in cyclohexane at a pressure of 1500 psi. Ethylene was supplied to the reactor by a calibrated thermal mass flow meter and was dissolved in the reaction solvent prior to the polymerization reactor. If comonomer was used it was also premixed with the ethylene before entering the polymerization reactor. Under these conditions the ethylene conversion is a dependent variable controlled by the catalyst concentration, reaction temperature and catalyst activity. etc.

The internal reactor temperature is monitored by a thermocouple in the polymerization medium and can be controlled at the required set point to +/− 0.5° C. Downstream of the reactor the pressure was reduced from the reaction pressure (1500 psi) to atmospheric pressure. The solid polymer was then recovered as a slurry in the condensed solvent and was dried by evaporation before analysis.

The ethylene conversion was determined by a dedicated on-line gas chromatograph. The average polymerization rate constant was calculated based on the reactor hold-up time, the catalyst concentration and the ethylene conversion and is expressed in l/(mmol*min).

Polymer Analysis

GPC analysis was carried out using a Waters 150C GPC using 1,2,4-trichlorobenzene as the mobile phase at 140° C. The samples were prepared by dissolving the polymer in the mobile phase solvent in an external oven at 0.1% (w/v) and were run without filtration. Molecular weights are expressed as polyethylene equivalents with a relative standard deviation of 2.9% and 5.0% for the Mn and Mw respectively.

Melt index (MI) measurements were conducted according to ASTM method D-1238-82.

Polymer densities were measured using pressed plaques (ASTM D-1928-90) with a densitometer.

EXAMPLE 1

Cyclopentadienyl titanium [(tri(t-butyl)phosphinimine)] (2,6-diisopropylphenoxy) chloride was added to the reactor at $12\times10^{-6}$ mol/l along with MMAO-7 (Akzo-Nobel) at Al/Ti=200 (mol/mol). The reaction temperature was 160° C. and 2.1 gram/min of ethylene was continuously added to the reactor. An ethylene conversion of 91.6% was observed. The results of the experiment are set forth in Table 1 below.

EXAMPLE 2

Conditions were as in example 1 except that $13\times10^{-6}$ mol/l of cyclopentadienyl titanium [(tri(t-butyl)phosphinimine)](2,6-diisopropylphenoxy) chloride was used along with 3 ml/min of 1-octene. An ethylene conversion of 88.8% was observed. The results of the experiment are set forth in Table 1 below.

COMPARATIVE EXAMPLE 3

$(C_5Me_5)TiCl_3$ (Aldrich) was added to the reactor at $37\times10^{-6}$ mol/l along with PMAO (Akzo-Nobel, Al/Ti=2880 mol/mol). The reaction temperature was 140° C. and 0.84 gram/min of ethylene was continuously added to the reactor. An ethylene conversion of 33% was obtained. The results of the experiment are set forth in table 1 below. The catalyst used in this experiment is a "typical" mono cyclopentadienyl group 4 catalyst used under a slightly lower reactor temperature. The reactivity of the catalyst is very low as seen in Table 1.

COMPARATIVE EXAMPLE 4

$(C_5Me_5)TiMe_3$ (Strem) was added to the reactor at $296\times10^{-6}$ mol/l along with $B(C_6F_5)_3$ (Strem, B/Ti=1.0 mol/mol). The reaction temperature was 140° C. and 0.84 gram/min of ethylene was continuously added to the reactor. An ethylene conversion of 42% was obtained. The results are set forth in Table 1 below. The catalyst used in this experiment is a "standard" mono cyclopentadienyl group 4 catalyst used under slightly lower conditions. The reactivity of the catalyst is very low as seen in Table 1.

COMPARATIVE EXAMPLE 5

$(C_5Me_5)TiMe_3$ (Strem) was mixed with one mole equivalent of piperidine in the catalyst tank generating $(C_5Me_5)TiMe_2N(CH_2)_5$ in situ. This solution was then added to the reactor at $800\times10^{-6}$ mol/l along with $B(C_6F_5)_3$ (Strem, B/Ti=3.0 mol/mol). The reaction temperature was 140° C. and 0.84 gram/min of ethylene was continuously added to the reactor. An ethylene conversion of 78% was observed. The results of the experiment are set forth in Table 1 below. While the conversion was acceptable and the molecular weight was reasonable the reactivity of the catalyst was low. The catalyst used represents those taught in U.S. Pat. No. 5,625,016.

COMPARATIVE EXAMPLE 6

$(C_5Me_5)TiMe_2N(i-Pr)_2$ was prepared and added to the reactor at $37\times10^{-6}$ mol/l along with $Ph_3C\,B(C_6F_5)_4$ (Asahi Glass B/Ti=1.0 mol/mol). The reaction temperature was 140° C. and 1.0 gram/min of ethylene was continuously added to the reactor. An ethylene conversion of 22% was observed. The results of the experiment are set forth in Table 1 below. While the conversion was acceptable and the molecular weight was reasonable the reactivity of the catalyst was low. The catalyst used represents those taught in U.S. Pat. No. 5,625,016.

COMPARATIVE EXAMPLE 7

$(C_5Me_5)TiCl_3$ (Strem) was added to the reactor at $37\times10^{-6}$ mol/l along with dibutylmagnesium (Akzo-Nobel, Mg/Ti=5.0 mol/mol) and $HNMe_2Ph\,B(C_6F_5)_4$ (Akzo-Noble, B/Ti=1.0 mol/mol). The reaction temperature was 140° C. and 1.0 gram/min of ethylene was continuously added to the reactor. An ethylene conversion of 30% was observed. The results of the experiment are set forth in Table 1 below. The catalyst used was another "typical" monocyclopentadienyl catalyst without a phosphinimine ligand.

COMPARATIVE EXAMPLE 8

$(C_5Me_5)_2ZrCl_2$ (Strem) was added to the reactor at $37\times10^{-6}$ mol/l along with MMAO-3 (Akzo-Nobel, Al/Ti=400 mol/mol). The reaction temperature was 140° C. and 1.0 gram/min of ethylene was continuously added to the reactor. An ethylene conversion of 55.5% was observed. The results of the experiment are set forth in Table 1 below. The catalyst used was another "standard" biscyclopentadienyl catalyst without a phosphinimine ligand. Catalyst activity is low as is the polymer molecular weight.

COMPARATIVE EXAMPLE 9

$(C_5Me_5)_2ZrCl_2$ (Strem) was added to the reactor at $37\times10^{-6}$ mol/l along with MMAO-3 (Akzo-Nobel, Al/Ti=400 mol/mol). The reaction temperature was 160° C. and 1.0 gram/min of ethylene was continuously added to the reactor. An ethylene conversion of 35.6% was observed. The results of the experiment are set forth in Table 1 below. This experiment is a repeat of experiment 8 at 160° C. and shows a decrease in the polymerization rate at the higher temperature as a result of more rapid catalyst decomposition. Also a reduction in polymer molecular weight is seen.

COMPARATIVE EXAMPLE 10

$(C_5Me_5)_2ZrCl_2$ (Strem) was added to the reactor at $37\times10^{-6}$ mol/l along with MMAO-3 (Akzo-Nobel, Al/Ti=400 mol/mol). The reaction temperature was 160° C. and 2.1 gram/min of ethylene was continuously added to the reactor. An ethylene conversion of 37.4% was observed. The results of the experiment are set forth in Table 1 below. This experiment is a repeat of experiment 9 at a higher ethylene concentration.

TABLE 1

| Ex | Total Flow To Reactor (ml/min) | Catalyst Concentration (mol/l × 10⁶) | Ethylene Conversion (%) | Calculated Polymerization Rate (kp) (l/mmol × min) | Polymer Density (g/cc) | Polymer Melt Index | Mn × 10⁻³ | Mw × 10⁻³ |
|---|---|---|---|---|---|---|---|---|
| 1 | 27.0 | 12 | 91.6 | 350 | 0.9464 | 0.007 | 86 | 211 |
| 2 | 27.0 | 13 | 88.6 | 235 | 0.9102 | 0.099 | 86 | 164 |
| 3 | 27.0 | 37 | 33 | 5 | — | — | 7.5 | 38.1 |
| 4 | 27.0 | 296 | 42 | 1 | — | — | 24 | 83 |
| 5 | 10.0 | 800 | 78 | 1 | — | 1.31 | 27 | 82 |
| 6 | 27.0 | 37 | 22 | 3 | — | — | 56 | 198 |
| 7 | 27.0 | 37 | 30 | 4 | — | 0.03 | — | — |
| 8 | 27.0 | 37 | 55.5 | 13 | — | 880 | 2.7 | 10 |
| 9 | 27.9 | 37 | 35.6 | 6 | — | — | 1.8 | 7.5 |
| 10 | 27.0 | 37 | 37.4 | 6 | — | 620 | 3.3 | 12 | kp is calculated as kp = (Q/100 − Q) × (1/TM) × (1/HUT)
where:
Q = the percent ethylene conversion
TM = the reactor catalyst concentration in mM
HUT = the reactor hold-up time in minutes
Table 1 demonstrates the following: The comparative examples according to U. S. Pat. 5,625,016 provide reasonable molecular weight but low reactivity. With typical bis metallocenes again there is low activity and low molecular weight. The present invention provides both good molecular weight (Mn or Mw) and a good polymerization rate.

What is claimed is:

1. A solution process for the polymerization of ethylene and optionally one or more aliphatic or aromatic hydrocarbyl $C_{2-20}$ mono- or diolefins at a temperature from 80° C. to 250° C. at pressures up to 15,000 psig, in the presence of a precursor comprising a Group 4 metal complex of the formula:

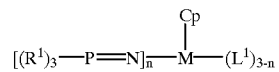

wherein M is selected from the group consisting of Ti, Zr, and Hf; n is 1 or 2; Cp is a monocyclopentadienyl ligand which is unsubstituted or substituted by up to five substituents independently selected from the group consisting of a $C_{1-10}$ hydrocarbyl radicals or two hydrocarbyl radicals taken together may form a ring which hydrocarbyl substituents or ring are unsubstituted or further substituted by a halogen atom, a $C_{1-8}$ alkyl radical, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals; germanyl radicals of the formula Ge—$(R^2)_3$ wherein $R^2$ is as defined above; each $R^1$ is independently selected from the group consisting of a hydrogen atom, a halogen atom, $C_{1-10}$ hydrocarbyl radicals which are unsubstituted by or further substituted by a halogen atom, a $C_{1-8}$ alkyl radical, $C_{1-8}$ alkoxy radical, a $C_{6-10}$ aryl or aryloxy radical, a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, germanyl radical of the formula Ge—$(R^2)_3$ wherein $R^2$ is as defined above or two $R^1$ radicals taken together may form a bidentate $C_{1-10}$ hydrocarbyl radical, which is unsubstituted by or further substituted by a halogen atom, a $C_{1-8}$ alkyl radical, $C_{1-8}$ alkoxy radical, a $C_{6-10}$ aryl or aryloxy radical, a silyl radical of the formula —Si—$(R^2)_3$ wherein each $R^2$ is independently selected from the group consisting of hydrogen, a $C_{1-8}$ alkyl or alkoxy radical, $C_{6-10}$ aryl or aryloxy radicals, germanyl radicals of the formula Ge—$(R^2)_3$ wherein $R^2$ is as defined above, provided that $R_1$ individually or two $R_1$ radicals taken together may not form a Cp ligand as defined above; each $L^1$ is independently selected from the group consisting of a hydrogen atom, of a halogen atom, a $C_{1-10}$ hydrocarbyl radical a $C_{1-10}$ alkoxy radical, a $C_{5-10}$ aryl oxide radical, each of which said hydrocarbyl, alkoxy, and aryl oxide radicals may be unsubstituted by or further substituted by a halogen atom, a $C_{1-8}$ alkyl radical, $C_{1-8}$ alkoxy radical, a $C_{6-10}$ aryl or aryl oxy radical, an amido radical which is unsubstituted or substituted by up to two $C_{1-8}$ alkyl radicals; a phosphido radical which is unsubstituted or substituted by up to two $C_{1-8}$ alkyl radicals, provided that $L^1$ may not be a Cp radical as defined above; and an activator.

2. The process according to claim 1, wherein in the Group 4 metal complex $R^1$ is selected from the group consisting of a hydrogen atom, a chlorine atom, a $C_{1-4}$ alkyl radical, a $C_{1-4}$ alkoxy radical, a silyl radical of the formula —Si—$(R^2)_3$ wherein each $R^2$ is independently selected from the group consisting of a hydrogen atom and a $C_{1-4}$ alkyl radical; a germanyl radical of the formula —Ge—$(R^2)_3$ wherein each $R^2$ is independently selected from the group consisting of a hydrogen atom and a $C_{1-4}$ alkyl radical.

3. The process according to claim 2, wherein in the Group 4 metal complex each $L^1$ is independently selected from the group consisting of a hydrogen atom, a chlorine atom, a $C^{1-6}$ alkyl radical, a $C_{1-6}$ alkoxy radical, and a $C_{6-10}$ aryl oxide radical.

4. The process according to claim 3, wherein in the Group 4 metal complex Cp is unsubstituted or substituted by up to five substituents selected from the group consisting of $C_{1-6}$ hydrocarbyl radicals or two hydrocarbyl radicals taken together may form a bridging ring, which ring and substituents may be further substituted by a substituent selected from the group consisting of a fluorine atom, a chlorine atom, an amido radical which is unsubstituted or substituted by up to two $C_{1-4}$ alkyl radicals, a phosphido radical which is unsubstituted or substituted by up to two $C_{1-4}$ alkyl radicals, a silyl radical of the formula —Si—$(R^2)_3$ wherein each $R^2$ is independently selected from the group consisting of a hydrogen atom and a $C_{1-4}$ alkyl radical; a germanyl radical of the formula —Ge—$(R^2)_3$ wherein each $R^2$ is independently selected from the group consisting of a hydrogen atom and a $C_{1-4}$ alkyl radical.

5. The process according to claim 4, wherein said activator is an aluminoxane of the formula $R^4{}_2AlO(R^4AlO)_mAlR^4{}_2$ wherein each $R^4$ is independently selected from the group consisting of $C_{1-20}$ hydrocarbyl radicals and m is from 0 to 50 and is present in an amount to provide a molar ratio of aluminum to group 4 metal from 50:1 to 1000:1.

6. The process according to claim 4, wherein in said aluminoxane each $R^4$ is independently selected from the group consisting of $C_{1-4}$ alkyl radicals and m is from 5 to 30.

7. The process according to claim 6, wherein the temperature is from 120° C. to 250° C. and the pressure is from 100 to 4,500 psig.

8. The process according to claim 7, wherein said mono- or di-olefins are selected from the group consisting of $C_{2-12}$ alpha olefins which are unsubstituted or substituted by up to $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical.

9. The process according to claim 4 wherein said activator comprises:
 1. an alkylating activator selected from the group consisting of $(R^3)_pMgX_{2-p}$ wherein X is a halide and each $R^3$ is independently selected from the group consisting of $C_{1-10}$ alkyl radicals and p is 1 or 2; $R^3Li$ wherein $R^3$ is as defined above, $(R^3)_qZnX_{2-q}$ wherein $R^3$ is as defined above, X is halogen and q is 1 or 2; $(R^3)_sAlX_{3-s}$ wherein $R^3$ is as defined above, X is halogen and s is an integer from 1 to 3; and
 2. an activator capable of ionizing the Group 4 metal complex is selected from the group consisting of
  (i) compounds of the formula $[R^5]^+[B(R^7)_4]^-$ wherein $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical;
  (ii) compounds of the formula $[(R^8)_tZH]^+[B(R^7)_4]^-$ wherein H is a hydrogen atom, Z is a nitrogen atom or phosphorus atom, t is 2 or 3 is Z is nitrogen or phosphorus and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and
  (iii) compounds of the formula $B(R^7)_3$ wherein $R^7$ is as defined above,
 to provide a molar ratio of Group 4 metal:metal in the alkylating activator:boron in the compound capable of ionizing the Group 4 metal complex from 1:1:1 to 1:10:5.

10. The process according to claim 9, wherein said metal alkylating activator is selected from the group consisting of $(R^3)_pMgX_{2-p}$ wherein X is a halide and $R^3$ is a $C_{1-4}$ alkyl radical and p is 1 or 2; $(R^3)_sAlX_{3-s}$ wherein $R^3$ is a $C_{1-4}$ alkyl radical, X is halogen and s is an integer from 1 to 3.

11. The process according to claim 10, wherein in the activator capable of ionizing the Group 4 metal complex $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilium radical which is substituted by two C1-4 alkyl radicals.

12. The process according to claim 11, wherein the temperature is from 120° C. to 250° C. and the pressure is from 100 to 4,500 psig.

13. The process according to claim 12, wherein said mono- or di-olefins are selected from the group consisting of ethylene and $C_{2-12}$ alpha olefins which are unsubstituted or substituted by up to $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a C1-4 alkyl radical.

14. The process according to claim 13, wherein said activator capable of ionizing the Group 4 metal complex is selected from the group consisting of:
 N,N- dimethylaniliumtetrakispentafluorophenyl borate;
 triphenylmethylium tetrakispentafluorophenyl borate; and trispentafluorophenyl boron.

15. The process according to claim 14, wherein said alkylating activator is a di-$C_{1-4}$ alkyl magnesium compound.

16. The process according to claim 15 wherein said alkylating activator is butyl ethyl magnesium.

17. The process according to claim 6, wherein said ethylene and said one or more aliphatic or aromatic hydrocarbyl $C_{2-20}$ mono- or di-olefins comprises at least 60 weight % of ethylene and up to 40 weight % of one or more $C_{4-10}$ alpha olefins.

18. The process according to claim 6, wherein said ethylene and said one or more aliphatic or aromatic hydrocarbyl $C_{2-20}$ mono- or di-olefins comprises from 5 to 95 weight % of ethylene and from 95 to 5 weight % of styrene.

19. The process according to claim 6, wherein said ethylene and said one or more aliphatic or aromatic hydrocarbyl $C_{2-20}$ mono- or di-olefins comprises from 50 to 75 weight % of ethylene; from 25 to 50 weight % of propylene and from 0 to 10 weight % of a diene monomer.

20. The process according to claim 8, wherein said ethylene and said one or more aliphatic or aromatic hydrocarbyl $C_{2-20}$ mono- or di-olefins comprises at least 60 weight % of ethylene and up to 40 weight % of one or more $C_{4-10}$ alpha olefins.

21. The process according to claim 8 wherein said ethylene and said one or more aliphatic or aromatic hydrocarbyl $C_{2-20}$ mono- or di-olefins comprises from 5 to 95 weight % of ethylene and from 95 to 5 weight % of styrene.

22. The process according to claim 8, wherein said ethylene and said one or more aliphatic or aromatic hydrocarbyl $C_{2-20}$ mono- or di-olefins comprises from 50 to 75 weight % of ethylene; from 25 to 50 weight % of propylene and from 0 to 10 weight % of a diene monomer.

23. The process according to claim 9, wherein said alpha olefin polymer comprises at least 60 weight % of ethylene and up to 40 weight % of one or more $C_{4-10}$ alpha olefins.

24. The process according to claim 9 wherein said alpha olefin polymer comprises from 5 to 95 weight % of ethylene and from 95 to 5 weight % of styrene.

25. The process according to claim 9, wherein said alpha olefin polymer comprises from 50 to 75 weight % of ethylene; from 25 to 50 weight % of propylene and from 0 to 10 weight % of a diene monomer.

26. The process according to claim 11, wherein said alpha olefin polymer comprises at least 60 weight % of ethylene and up to 40 weight % of one or more $C_{4-10}$ alpha olefins.

27. The process according to claim 11 wherein said alpha olefin polymer comprises from 5 to 95 weight % of ethylene and from 95 to 5 weight % of styrene.

28. The process according to claim 11, wherein said alpha olefin polymer comprises from 50 to 75 weight % of ethylene; from 25 to 50 weight % of propylene and from 0 to 10 weight % of a diene monomer.

29. The process according to claim 15, wherein said alpha olefin polymer comprises at least 60 weight % of ethylene and up to 40 weight % of one or more $C_{4-10}$ alpha olefins.

30. The process according to claim 15, wherein said alpha olefin polymer comprises from 5 to 95 weight % of ethylene and from 95 to 5 weight % of styrene.

31. The process according to claim 15, wherein said alpha olefin polymer comprises from 50 to 75 weight % of ethylene; from 25 to 50 weight % of propylene and from 0 to 10 weight % of a diene monomer.

* * * * *